(12) United States Patent
Chang et al.

(10) Patent No.: US 8,416,274 B2
(45) Date of Patent: Apr. 9, 2013

(54) SYSTEM AND APPARATUS FOR VOICE/VIDEO COMMUNICATION AND METHOD THEREOF

(75) Inventors: Chia-Yuan Chang, Taichung (TW);
Rong-Quen Chen, Taipei (TW);
Ting-Han Huang, Taichung (TW);
Chih-Yin Lin, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 268 days.

(21) Appl. No.: 12/952,569

(22) Filed: Nov. 23, 2010

(65) Prior Publication Data

US 2012/0019609 A1 Jan. 26, 2012

(30) Foreign Application Priority Data

Jul. 26, 2010 (TW) ................................ 99124504 A
Oct. 13, 2010 (TW) ................................ 99135155 A

(51) Int. Cl.
*H04N 7/14* (2006.01)

(52) U.S. Cl. ............... 348/14.01; 348/14.08; 348/14.12; 370/352

(58) Field of Classification Search .... 348/14.01–14.16; 379/202.01; 370/352, 401
See application file for complete search history.

(56) References Cited

U.S. PATENT DOCUMENTS

| | | | |
|---|---|---|---|
| 2003/0072429 A1* | 4/2003 | Slobodin et al. | 379/202.01 |
| 2007/0160034 A1* | 7/2007 | Koretsky | 370/352 |
| 2008/0075067 A1* | 3/2008 | Guglielmi et al. | 370/352 |
| 2008/0123685 A1* | 5/2008 | Varma et al. | 370/466 |
| 2008/0309753 A1* | 12/2008 | Karnalkar et al. | 348/14.11 |
| 2009/0304013 A1* | 12/2009 | Green et al. | 370/401 |

* cited by examiner

*Primary Examiner* — Melur Ramakrishnaiah
(74) *Attorney, Agent, or Firm* — WPAT, P.C.; Anthony King

(57) ABSTRACT

A voice/video communication system is disclosed. The system includes a caller having a first PSTN subsystem and a first data subsystem, and a callee, wherein the first data subsystem encodes the caller's public IP address/port into a first key sequence and triggers the first PSTN system to send first audio coding representing the first key sequence to the callee.

8 Claims, 3 Drawing Sheets

SYSTEM AND APPARATUS FOR VOICE/VIDEO COMMUNICATION AND METHOD THEREOF

BACKGROUND OF THE INVENTION

1. Field of the Invention

The exemplary embodiment(s) of the present invention relates to a field of voice/video communication. More specifically, the exemplary embodiment(s) of the present invention relates to voice/video conferencing without using a presence server.

2. Description of Related Art

Communication over the Internet gains more and more importance. With increasing transmission rates and a better availability of Internet access, the utilization of the Internet is no more restricted to transmitting texts only for quite some time. Real time communication systems like Internet telephony (Voice over IP, VOIP) or video conferencing are gaining more and more importance. In particular, VOIP is not only a matter of interest for companies anymore, but also for regular customers using these technologies at home.

As in the traditional telephone networks, two phases can be basically distinguished for VOIP: the set up of a call and the transmission of the voice data. For the set up of the call, it is necessary to find the communication participants in the Internet as well as the corresponding communications paths between the individual participants. The communication paths comprise the individual servers and nodes that are necessary for the communication.

FIG. 1 shows a traditional video conference system. The system includes a STUN server 11, a presence server 12, a caller 13 and a callee 14. The STUN server 11 implements Simple Traversal of User Datagram Protocol (UDP) Through Network Address Translators (NATs), enables the caller 13 and callee 14 behind a NAT (that is, clients behind a router) to discover the presence of a NAT, the type of NAT, and then to learn the address bindings (including IP addresses and port mappings) allocated by the NAT. When the caller 13 or callee 14 sends a request to the STUN server 11, the STUN server 11 examines the request's source IP address and port and copies them into a response that it sends back to the caller 13 or callee 14. The presence server 12 handles registration, storage, and retrieval of presence information. Presence describes the caller/callee's availability and willingness to communicate. The presence server 12 can signal whether the caller 13 and callee 14 are on- or offline and whether they are idle or available. During the call set up phase, the caller 13 must look up the callee's public IP address/port in the presence server 12.

However, since the presence server 12 is generally provided by an internet service provider, the video conference or VOIP devices must be tightly coupled with user's subscription to a specific ISP. This is disadvantageous for end users.

SUMMARY OF THE INVENTION

A voice/video communication system is disclosed. The system includes a caller having a first PSTN subsystem and a first data subsystem, and a callee, wherein the first data subsystem encodes the caller's public IP address/port into a first key sequence and triggers the first PSTN system to send first audio coding representing the first key sequence to the callee.

An apparatus for voice/video communication system is also disclosed. The apparatus includes a data subsystem generating a request to a STUN server to find out a public IP address/port of the apparatus and encoding the public IP address/port into a first key sequence, and a PSTN subsystem generating first audio coding representing the first key sequence and sending the first keypad tones to a callee.

A method for voice/video communication system is disclosed. The method includes the steps of encoding the caller's and callee's public IP addresses/ports into a first and second key sequences respectively, sending audio coding representing the first key sequence from the caller to the callee, and sending keypad tones representing the second key sequence from the callee to the caller, and decoding the first and second key sequences to acquire the caller's and callee's public IP addresses/ports by the callee and caller respectively.

With these and other objects, advantages, and features of the invention that may become hereinafter apparent, the nature of the invention may be more clearly understood by reference to the detailed description of the invention, the embodiments and to the several drawings herein.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PREFERRED EMBODIMENTS

Exemplary embodiments of the present invention are described herein in the context of a method, system and apparatus for voice/video communication which eliminate the need for a presence server.

Those of ordinary skilled in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In accordance with the embodiment(s) of the present invention, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

Figure 1:
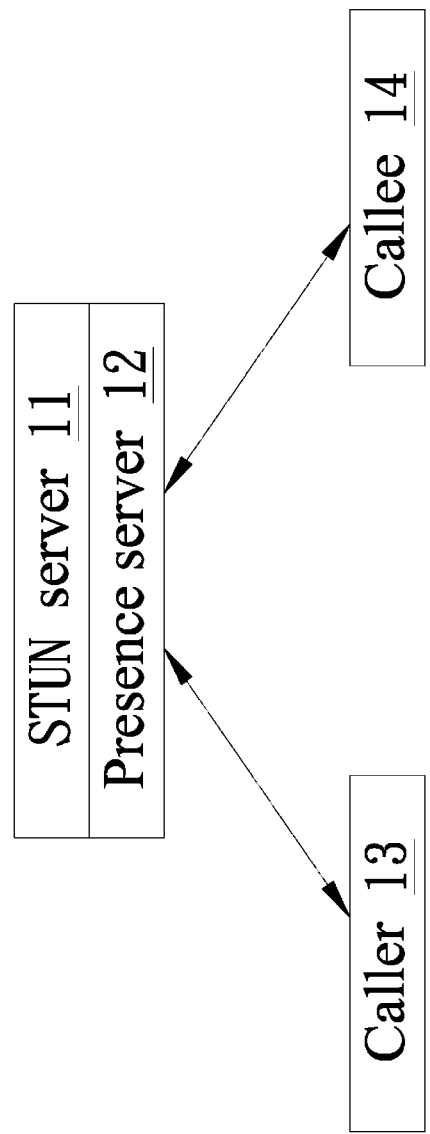
FIG. 1 shows a traditional video conference system.
Figure 2:
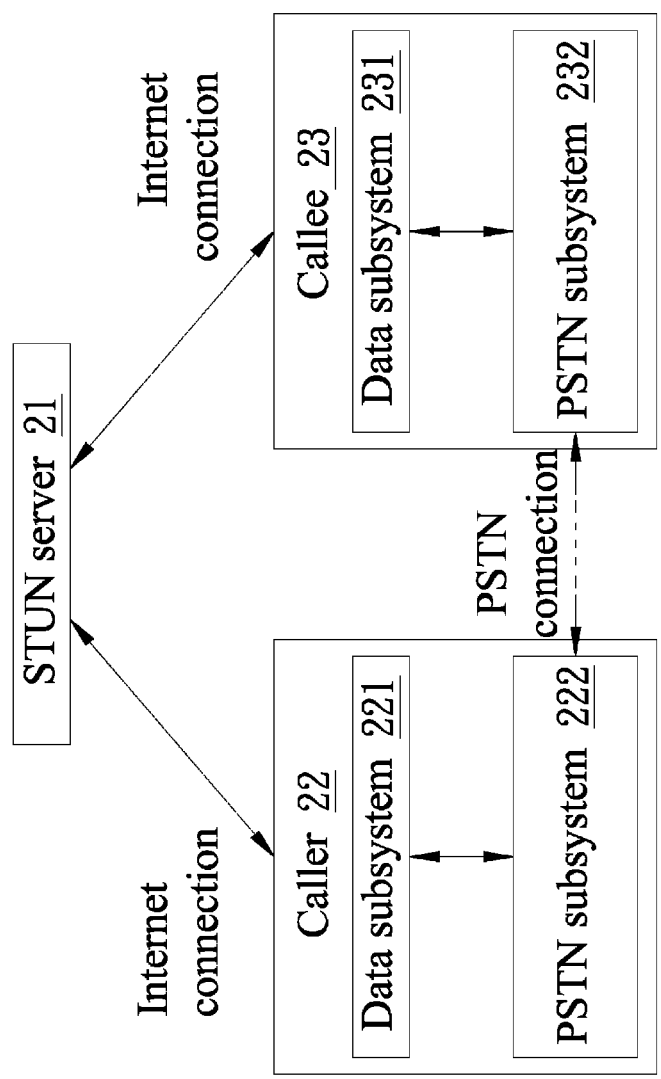
FIG. 2 shows a voice/video communication system according to an embodiment of the present invention.

FIG. 2 shows a voice/video communication system according to an embodiment of the present invention. The voice/video communication system includes a STUN server 21, a caller 22 and a callee 23. The caller 22 includes a data subsystem 221 and a PSTN subsystem 222. The callee 23 include a data subsystem 231 and a PSTN subsystem 232. The data subsystems 221 and 231 send requests to the STUN server 21 to find out the caller's and callee's public IP addresses/ports respectively. During a call set up phase, the PSTN subsystem 222 of the caller 22 sends a request for a PSTN call to the PSTN subsystem 232 of the callee 23. In response to the PSTN call request, the PSTN subsystem 232 of the callee 23 accepts the request. Then, the PSTN subsystem 222 of the caller 22 sends a request for a video conference call to the PSTN subsystem 232 of the callee 23. In response to the video conference call request, the PSTN subsystem 232 of the callee 23 accepts the request.

Further, the data subsystem 221 of the caller 22 encodes the caller's public IP address/port found in the STUN server 21 into a key sequence, while the data subsystem 231 of the callee 23 encodes the callee's public IP address/port found in the STUN server 21 into another key sequence. For exchanging of the public IP address/port information between the caller 22 and callee 23, the data subsystem 221 of the caller 22 triggers the PSTN subsystem 222 to send to the PSTN subsystem 232 of the callee 23 audio coding representing the key sequence into which the caller's public IP address/port is encoded. Similarly, the data subsystem 231 of the callee 23 triggers the PSTN subsystem 232 to send to the PSTN subsystem 222 of the caller 22 audio coding representing the key sequence into which the callee's public IP address/port is encoded. To be emphasized, the aforesaid audio coding could be, for example, dual tone multi-frequency (DTMF) keypad tones, frequency shift keying (FSK) or phase shift keying (PSK), etc.

After the PSTN subsystem 232 of the callee 23 receives the audio coding from the caller 22, the data subsystem 231 decodes the key sequence represented by the audio coding to acquire the caller's public IP address/port. Similarly, after the PSTN subsystem 222 of the caller 22 receives the audio coding from the callee 23, the data subsystem 221 decodes the key sequence represented by the audio coding to acquire the callee's public IP address/port. Then, the data subsystem 221 of the caller 22 sends a request for video data communication to the data subsystem 231 of the callee 23, and the data subsystem 231 of the callee 23 accepts the request in response. Thus, the call set up phase is completed and the caller 22 and callee 23 start to transmit voice/video data using the information about the public IP addresses/ports they exchanged during the call set up phase.

Figure 3:
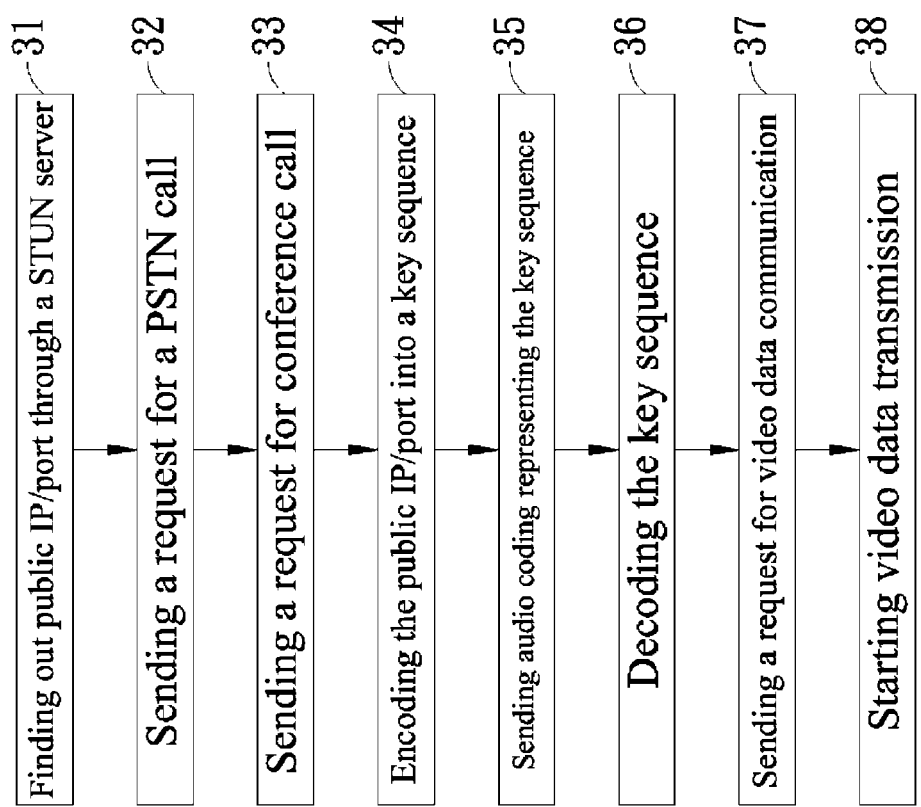
FIG. 3 shows a flowchart of a method for voice/video communication according to one embodiment of the present invention.

FIG. 3 shows a flowchart of a method for voice/video communication according to one embodiment of the present invention.

In step 31, a caller and a callee send requests to a STUN server to find out their public IP addresses/ports In step 32, the caller sends a request for a PSTN call to the callee, and the callee accepts the request in response.

In step 33, the caller sends a request for a video conference to the callee, and the callee accepts the request in response.

In step 34, the caller's and callee's public IP addresses/ports are encoded into a first and second key sequences respectively.

In step 35, PSTN audio coding representing the first key sequence are sent from the caller to the callee, and PSTN audio coding representing the second key sequence are sent from the callee to the caller.

In step 36, the first and second key sequences are decoded by the callee and caller to acquire the caller's and callee's public IP addresses/ports respectively.

In step 37, the caller sends a request for video data communication to the callee, and the callee accepts the request in response.

In step 38, the caller and callee start to transmit voice/video data using the information about the public IP addresses/ports they exchanged.

As described above, in the voice/video communication system of the present invention, the caller and callee exchange their public IP address/port information by PSTN audio coding representing key sequences into which their public IP addresses/ports are encoded. This eliminates the need for a presence server. The voice/video communication peers can use existing PSTN phone connection as the signaling media. Although the STUN server is still necessary, free and public STUN servers are easily available and their list can be pre-stored in the voice/video communication peer and updated through internet connection. This further eliminates the need for subscription to a specific ISP so that the end product of the voice/video communication peer can be sold to any customer.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. A voice/video communication system comprising:
   a caller having a first PSTN subsystem and a first data subsystem;
   a callee; and
   a STUN server, wherein the first data subsystem sends a request to the STUN server to find out the callers' public IP address/port;
   wherein the caller sends a request for a PSTN call to the callee, and the callee accepts the request, then the caller sends a request for a video conference to the callee, and the callee accepts the request;
   the first data subsystem encodes the caller's public IP address/port into a first key sequence and triggers the first PSTN system to send first audio coding representing the first key sequence to the callee; and
   the caller sends a request for video data communication to the callee, and the callee accepts the request.

2. The voice/video communication system as claimed in claim 1, wherein the first audio coding comprises keypad tone, frequency shift keying or phase shift keying.

3. The voice/video communication system as claimed in claim 1, wherein the callee has a second PSTN subsystem and a second data subsystem, and the second data subsystem encodes the callee's public IP address/port into a second key sequence and triggers the second PSTN system to send second audio coding representing the second key sequence to the caller.

4. The voice/video communication system as claimed in claim 3, wherein the first data subsystem decodes the second key sequence represented by the second audio coding received from the second PSTN subsystem.

5. The voice/video communication system as claimed in claim 4, wherein the second data subsystem decodes the first key sequence represented by the first audio coding received from the first PSTN subsystem.

6. A method for voice/video communication comprising the steps of:
   sending a request to a STUN server to find out a public IP addresses/port of a caller or callee;
   sending a request for a PSTN call from the caller to the callee, and accepting the request by the callee;
   sending a request for a video conference from the caller to the callee, and accepting the request by the callee;
   encoding the caller's and callee's public IP addresses/ports into a first and second key sequences respectively;
   sending audio coding representing the first key sequence from the caller to the callee, and sending audio coding representing the second key sequence from the callee to the caller;
   decoding the first and second key sequences to acquire the caller's and callee's public IP addresses/ports by the callee and caller respectively; and
   sending a request for video data communication from the caller to the callee, and accepting the request by the callee.

7. An apparatus for voice/video communication comprising:
   a data subsystem generating a request to a STUN server to find out a public IP address/port of the apparatus and encoding the public IP address/port into a first key sequence; and
   a PSTN subsystem sending a request for a PSTN call to a callee, sending a request for a video conference to the callee, generating first audio coding representing the first key sequence and sending the first audio coding to the callee, while the first audio coding accepted by the callee, the data subsystem sends a request for video data communication to the callee.

8. The apparatus for voice/video communication as claimed in claim 7, wherein the PSTN subsystem receives second audio coding representing a second key sequence into which a public IP address/port of the callee is encoded, and the data subsystem decodes the second key sequence to acquire the public IP address/port of the callee.

* * * * *